United States Patent
Matsushima et al.

(10) Patent No.: US 9,463,773 B2
(45) Date of Patent: Oct. 11, 2016

(54) STEERING LOCK APPARATUS

(71) Applicant: NSK Ltd., Shinagawa-ku, Tokyo (JP)

(72) Inventors: Tooru Matsushima, Maebashi (JP); Kiyoshi Sadakata, Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 14/003,432

(22) PCT Filed: Apr. 18, 2013

(86) PCT No.: PCT/JP2013/061523
§ 371 (c)(1),
(2) Date: Sep. 5, 2013

(87) PCT Pub. No.: WO2014/170991
PCT Pub. Date: Oct. 23, 2014

(65) Prior Publication Data
US 2016/0031414 A1    Feb. 4, 2016

(51) Int. Cl.
*B60R 25/02* (2013.01)
*B60R 25/021* (2013.01)
*E05B 79/02* (2014.01)

(52) U.S. Cl.
CPC ......... *B60R 25/02126* (2013.01); *B60R 25/02* (2013.01); *B60R 25/021* (2013.01); *B60R 25/0211* (2013.01); *E05B 79/02* (2013.01)

(58) Field of Classification Search
CPC .......... B60R 25/02153; B60R 25/021; B60R 25/02126; B60R 25/02105; B60R 25/02115; B60R 25/0211; B60R 25/02; B60R 25/0222; B60R 25/023
USPC ........................................... 70/182–186, 252
See application file for complete search history.

(56) References Cited

U.S. PATENT DOCUMENTS 5,730,010 A * 3/1998 Norimatsu ........ B60R 25/02105
70/186
5,730,011 A * 3/1998 Terai ................. B60R 25/02105
70/186

(Continued)

FOREIGN PATENT DOCUMENTS

CN    101052554 A    10/2007
CN    102448794 A    5/2012

(Continued)

OTHER PUBLICATIONS

Japanese-language Written Opinion (PCT/ISA/237) dated Jun. 11, 2013 (Four (4) pages).

(Continued)

*Primary Examiner* — Suzanne Barrett
(74) *Attorney, Agent, or Firm* — Crowell & Moring LLP

(57) ABSTRACT

A protruding wall section 17 is provided on the outer circumferential surface of a steering column 2*b* around a lock hole 11*a*, a concave groove 20 that engages with the protruding wall section 17 is provided in a portion that surrounds a guide section 13*a* of a butting surface 19 of a lock unit 12*a*, and by engaging the protruding wall section 17 with the concave groove 20, and preferably, by engaging concave sections 18 that are provided in the steering column 2*b* with convex sections 21 that are provided on the lock unit 12*a* so that the lock unit 12*a* is supported by and fastened to the steering column 2*b*, the occurrence of damage such as cracking of the steering column 2*b* is prevented even when there is an attempt to rotate a steering wheel by large force when an ignition key is turned OFF.

5 Claims, 6 Drawing Sheets

(56) References Cited

U.S. PATENT DOCUMENTS

| | | | |
|---|---|---|---|
| 5,974,841 A * | 11/1999 | Naganuma | B60R 25/02 70/186 |
| 9,145,161 B2 * | 9/2015 | Nagasawa | B22D 19/045 |
| 9,254,860 B2 * | 2/2016 | Mihara | B62D 1/185 |
| 2005/0268739 A1 | 12/2005 | Sato et al. | |
| 2009/0229325 A1 * | 9/2009 | Cymbal | B60R 25/02107 70/189 |
| 2011/0132048 A1 | 6/2011 | Okada | |
| 2011/0204610 A1 * | 8/2011 | Kwon | B62D 1/184 280/775 |
| 2012/0291584 A1 | 11/2012 | Tanaka | |
| 2014/0197293 A1 * | 7/2014 | Fujiwara | B62D 1/195 248/274.1 |
| 2015/0107398 A1 * | 4/2015 | Nagasawa | B22D 17/00 74/493 |
| 2015/0107399 A1 * | 4/2015 | Nagasawa | B22D 19/045 74/493 |
| 2015/0114054 A1 * | 4/2015 | Matsushima | B60R 25/0215 70/252 |

FOREIGN PATENT DOCUMENTS

| | | | | |
|---|---|---|---|---|
| JP | 8-295202 A | | 11/1996 | |
| JP | 2008-179216 A | | 8/2008 | |
| JP | 2008-184055 A | | 8/2008 | |
| JP | 2008-265646 A | | 11/2008 | |
| JP | 2009-190680 A | | 8/2009 | |
| JP | 2010-36724 A | | 2/2010 | |
| JP | 2010-100246 A | | 5/2010 | |
| JP | 2010-105495 A | | 5/2010 | |
| JP | 2012030622 A | * | 2/2012 | |
| WO | WO 2004/007253 A1 | | 1/2004 | |
| WO | WO 2012023366 A1 | * | 2/2012 | ......... B60R 25/0211 |

OTHER PUBLICATIONS

International Search Report dated Jun. 11, 2013 (Three (3) pages).
Chinese Office Action issued in counterpart Chinese Application No. 201380001448.9 dated Nov. 4, 2015 (five (5) pages).
Japanese Office Action issued in counterpart Japanese Application No. 2014-165445 dated Jun. 2, 2015 (two (2) pages).

* cited by examiner

STEERING LOCK APPARATUS

TECHNICAL FIELD

The present invention relates to a steering lock apparatus that makes it impossible to operate the steering wheel of an automobile in order to prevent theft.

BACKGROUND ART

FIG. 8 illustrates an example of conventional structure of a steering apparatus for applying a steering angle to steered wheels (front wheels). In this steering apparatus, a steering shaft 3 is supported on the inner diameter side of a cylindrical shaped steering column 2 that is supported by a vehicle body 1 so as to be able to rotate freely, and a steering wheel 4 is fastened to the rear end section of the steering shaft 3 that protrudes toward the rear further than the opening on the rear end of the steering column 2. When the steering wheel 4 is rotated, the rotation is transmitted to an input shaft 8 of a steering gear unit 7 by way of the steering shaft 3, a universal joint 5a, an intermediate shaft 6 and a universal joint 5b. As the input shaft 8 rotates, a pair of tie rods 9 that are located on both sides of the steering gear unit 7 are pushed or pulled, which applies a steering angle to a pair of steered wheels according to the amount that the steering wheel 4 is operated. In the case of the structure illustrated in FIG. 8, a telescopic steering column and steering shaft are used as the steering column 2 and steering shaft 3 so that it is possible to adjust the forward-backward position of the steering wheel 4.

In recent years, various kinds of anti-theft apparatuses have been installed in automobiles as a countermeasure against theft of the automobile. One kind of such an anti-theft apparatus is a steering lock apparatus that makes it impossible to operate the steering wheel unless a proper key is used. FIG. 9 illustrates an example of a steering lock apparatus that is disclosed in JP 2008-265646 (A). In a steering lock apparatus 10, with a guide section 13 that is provided on the tip end section of a lock unit 12 arranged inside a lock hole 11 that is formed in the intermediate section in the axial direction of the steering column 2a, the lock unit 12 is supported by and fastened to the steering column 2a. Moreover, a key-lock collar 15 having an engaging concave section 14 formed in at least one location in the circumferential direction thereof is fastened around a location of part of the steering shaft 3a that is in phase in the axial direction with the lock unit 12. During operation (during key lock), the tip end section of a lock pin 16 of the lock unit 12 displaces toward the inner-diameter side of the steering column 2a and engages with the engaging concave section 14, such that the rotation of the steering shaft 3a is essentially prevented with force about the size of that for operating the steering wheel 4 in the normal driving position. However, when the steering wheel 4 is rotated by force that exceeds a value that is regulated by the key lock regulation even in a case where the engaging concave section 14 is engaged with the lock pin 16, the steering shaft 3a rotates with respect to the key-lock collar 15. In a steering lock apparatus with this kind of structure, the key-lock collar 15 and steering shaft 3a are not damaged even though the steering wheel is rotated by large force with the ignition key in the OFF state.

On the other hand, being influenced by energy conservation in recent years, and in order to improve fuel consumption performance and reduce costs, there is a need to reduce the weight of the steering column 2a by making the thickness of the steering column 2a thinner, or the like. When the thickness of the steering column 2a is made thinner, there is a possibility that the anti-theft function will be lost when using the structure disclosed in JP 2008-265646 (A). In other words, when attempting to rotate the steering wheel 4 by large force with the ignition key turned OFF and the engaging concave section 14 of the key-lock collar 15 engaged with the lock pin 16, before the steering shaft 3a can rotate with respect to the key-lock collar 15, a large force is applied from the lock pin 16 to the circumferential edge section of the lock hole 11 by way of the guide section 13 due to a large friction force that is greater than the dynamic friction force. Due to the large force that is applied to the circumferential edge section of the lock hole 11, there is a possibility that damage such as cracking of the steering column 2a, which is made of a light alloy material such as an aluminum alloy, or carbon steel for machine structure having a thin wall thickness, will occur. In that case, there is a possibility that the lock hole 11 and the guide section 13 will become disengaged, and that the lock unit 12 will rotate around the steering column 2a. In this state, engagement of the engaging concave section 14 and the lock pin 16 easily becomes disengaged, however, when this engagement actually becomes disengaged, the steering shaft 3a rotates on the inner-diameter side of the steering column 2a, so the anti-theft function is lost.

In order to solve this kind of problem, JPH 08-295202 (A) discloses a structure in which a convex section of the lock unit that is formed on a butting surface that comes in contact with the outer circumferential surface of the steering column fits in a through hole that is formed in the steering column such that there is no movement. With this kind of structure, the force that is applied to the steering column from the steering wheel is distributed, and it is possible to suppress the occurrence of damage to the steering column. However, with this structure, the through hole that passes through in the radial direction through the steering column is provided on the circumferential edge section of the lock hole of the steering column, so the strength and rigidity of the circumferential edge section of the lock hole are decreased to some extent, and there is a possibility that a sufficient effect of preventing damage will not always be obtained.

RELATED LITERATURE

Patent Literature

[Patent Literature 1] JP 2008-265646 (A)
[Patent Literature 2] JP H08-295202 (A)

SUMMARY OF THE INVENTION

Problem to be Solved by the Invention

Taking into consideration the situation described above, the object of the present invention is to achieve structure of a steering lock apparatus that makes it impossible to operate the steering wheel of an automobile in order to prevent theft in which, when an attempt is made to rotate the steering wheel by large force with the ignition key turned OFF, it is possible to prevent the occurrence of damage such as cracking of the steering column.

Means for Solving the Problems

The steering lock apparatus of the present invention has a steering column, a key-lock collar and a lock unit. The steering column, which is cylindrical shaped, is supported by a vehicle body and has a lock hole that is provided in a part of the outer circumferential surface of the steering column so as to pass through the steering column in the radial direction thereof, and a protruding wall section that is provided on the outer circumferential surface so as to surround the lock hole. The key-lock collar is supported by a portion of a steering shaft, which is supported on the inside of the steering column so as to be able to rotate freely, the phase of the portion in an axial direction of the steering column coinciding with the lock hole, and the key-lock collar has an engaging concave section provided in at least one location on the outer circumferential surface in the circumferential direction of the outer column. The steering shaft protrudes further toward the rear than the steering column, and a steering wheel is fastened to the rear end section of the steering shaft.

The lock unit is supported by and fastened to the steering column and has: a butting surface that comes in contact with the outer circumferential surface of the steering column; a guide section that is formed on the tip end section of the butting surface and is located in the inside portion of the lock hole when the butting surface is in contact with the outer circumferential surface of the steering column; a concave groove that is formed in a portion of the butting surface that surrounds the guide section and engages with the protruding wall section; and a locking pin that essentially prevents rotation of the steering shaft when the ignition key is turned OFF by displacing inward in the radial direction of the steering column, causing the tip end section thereof to engage with the engaging concave section.

Preferably, at least the inside surface of the outer-diameter side end section of the protruding wall section is separated further from the center position of the lock hole than the portion near the inner-diameter side thereof. Furthermore, preferably, the inside surface of the outer-diameter side half portion of the protruding wall section is separated further from the center position of the lock hole than the inner-diameter side half portion thereof. In other words, a stepped surface that is stepped outward in the radial direction is provided on the inside surface of the protruding wall section. A space between the inside surface of the protruding wall section and the outside surface of the guide section of the lock unit is provided in the portion where this stepped surface is located.

Preferably, an inclined surface section that is inclined in a direction toward the outside of the protruding wall section going outward in the radial direction is provided in at least the outer-diameter side half portion of the inside surface of the protruding wall section, and the thickness of this protruding wall section is thicker at the base end section (inner-diameter side end section) than at the tip end section (outer-diameter side end section). It is possible to provide the inclined surface section over the entire inside surface. In this case as well, a space is provided between the inclined surface section and the outside surface of the guide section of the lock unit.

Furthermore, the cross-sectional shape of the inside surface of the protruding wall section can be a partial arc shaped convex curved surface that protrudes the most in the middle section in the radial direction. In this case as well, a space is provided between at least the inside surface of the outer-diameter side end section of the protruding wall section and the outside surface of the guide section of the lock unit.

In the steering lock apparatus of the present invention, preferably concave sections are formed in part of the outer circumferential surface of the steering column and convex sections are formed on part of the butting surface of the lock unit such that the lock unit is fitted to the steering column without backlash by engaging the convex section with the concave sections. In this case, preferably the concave sections have a bottom.

Additionally, it is possible to provide reinforcing ribs at plural locations on the outside surface of the protruding wall section.

Effect of the Invention

In the case of the steering lock apparatus of the present invention that is structured as described above, it is possible to prevent damage such as cracking of the steering column even though an attempt is made to rotate the steering wheel by large force when the ignition key is turned OFF. In other words, a protruding wall section is provided on the outer circumferential surface of the steering column so at to surround the lock hole. Therefore, when an attempt is made to rotate the steering wheel by large force when the ignition key is turned OFF and the key-lock pin is engaged with the engaging concave section, it is possible to increase the strength and rigidity of the circumferential edge section of the lock hole, which is the portion where the large force is applied. As a result, it is possible to suppress damage to the steering column.

MODES FOR CARRYING OUT THE INVENTION

First Example of Embodiment

FIG. 1 to FIGS. 3A to 3C illustrate a first example of an embodiment of the present invention. The steering lock apparatus of this example basically has: a steering column having a lock hole that is provided in a part of the outer circumferential surface of the steering column so as to pass through the steering column in the radial direction; a key-lock collar that is supported by a portion of the steering shaft, which is supported inside the steering column so as to rotate freely, the phase in the axial direction of the portion coinciding with the lock hole, and that is provided with engaging concave sections at plural locations in the circumferential direction on the outer circumferential surface of the key-lock collar; and a lock unit that is supported by and fastened to the steering column, the lock unit having a butting surface that comes in contact with the outer circumferential surface of the steering column; a guide section that is located in the inside portion of the lock hole when the butting surface is in contact with the outer circumferential surface of the steering column; and a lock pin that, by displacing inward in the radial direction of the steering column and the tip end thereof engaging with the engaging concave section, essentially prevents rotation of the steering shaft. The present invention can also be applied to structure in which an engaging concave section is formed in at least one location in the key-lock collar.

Figure 9:
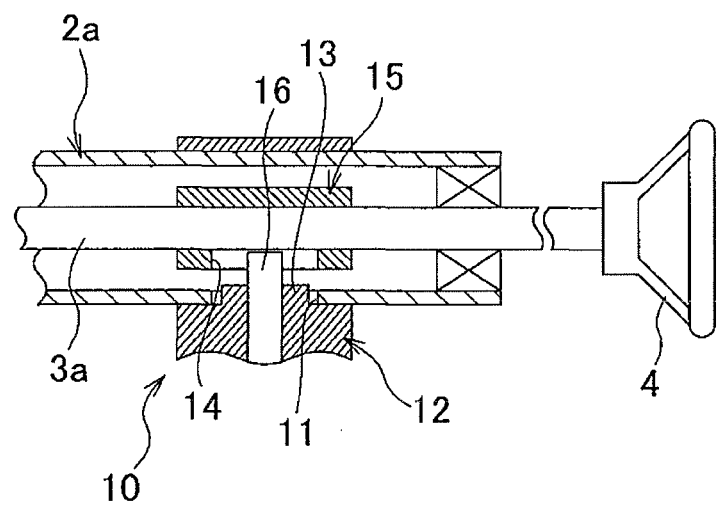
FIG. 9 is a cross-sectional view illustrating an example of conventional structure of a steering lock apparatus.

A feature of the steering lock apparatus of the present invention, including this example, is that based on the basic structure described above, it is possible to prevent the occurrence of damage such as cracking of the steering column even when there is an attempt to rotate the steering wheel by large force when the ignition key is turned OFF. The structure and functions of the other parts are the same as is in the steering lock apparatus having conventional structure, including the structure illustrated in FIG. 9.

In the case of this example, a protruding wall section 17 that surrounds the lock hole 11a is provided in the circumferential edge section of the lock hole 11a on the outer circumferential surface of the steering column 2b. In the example in the drawings, the protruding wall section 17 is provided so as to surround the entire lock hole 11a, however, it is also possible to provide the protruding wall intermittently in the circumferential direction. In either case, when the steering column 2b is made by die cast molding using a light alloy material such as an aluminum alloy, this kind of protruding wall 17 is formed at the same time. Alternatively, it is also possible to form this protruding wall 17 on a steering column 2b, which is a pipe made using a light alloy material such as aluminum alloy, or carbon steel tubing for thin wall machine structure, by performing plastic working such as burring or drawing of the circumferential edge of the lock hole 11a after the lock hole 11a has been formed.

Figure 1:
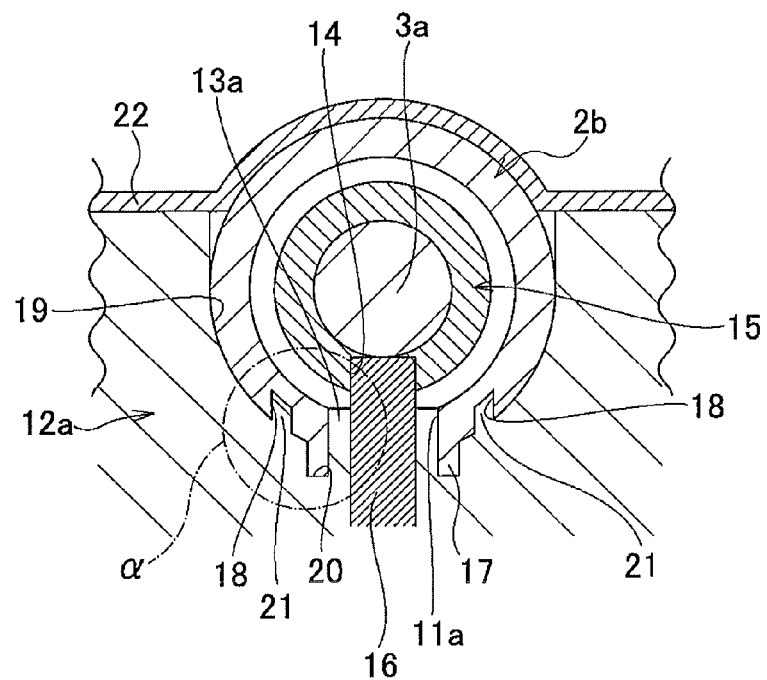
FIG. 1 is a cross-sectional view illustrating the major section of a first example of an embodiment of the present invention.
Figure 2:
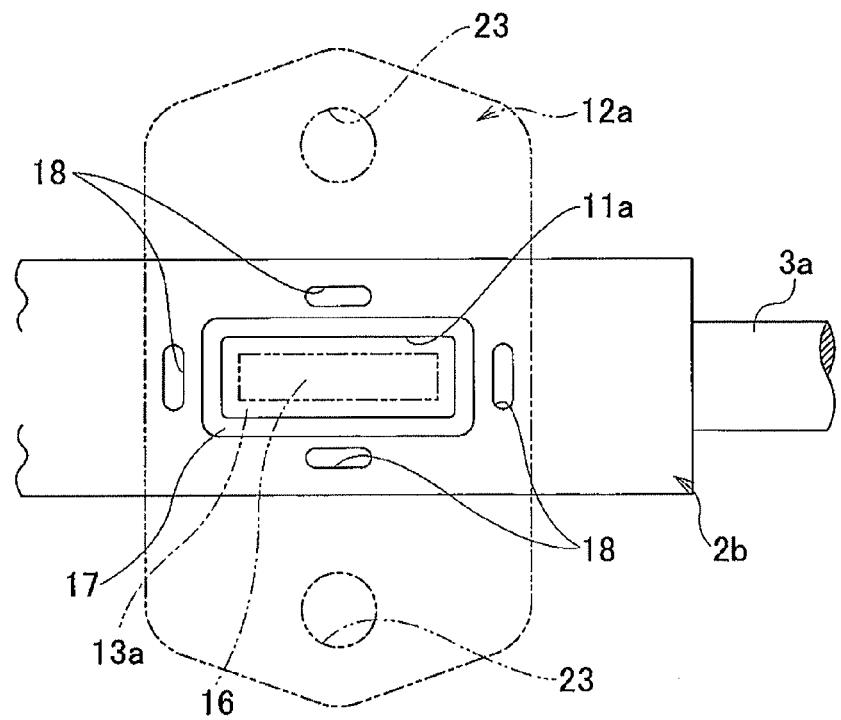
FIG. 2 is a drawing that omits the lock unit, and illustrates the state as seen from underneath in FIG. 1.
Figure 3A:
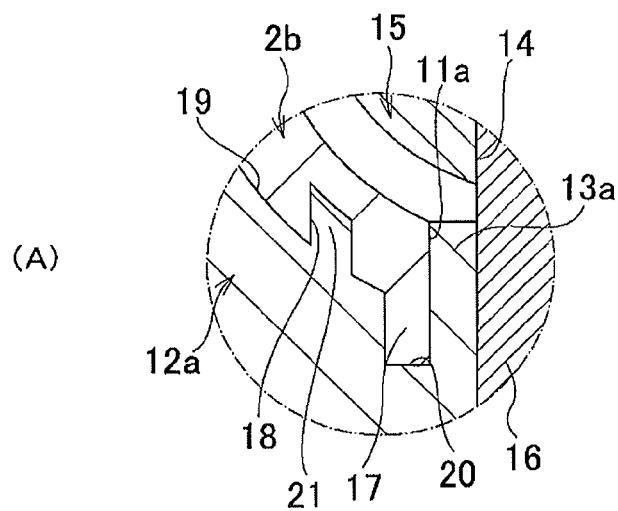
FIGS. 3A to 3C illustrate three examples of the shape of a concave section, and are enlarged views of section a in FIG. 1.
Figure 3B:
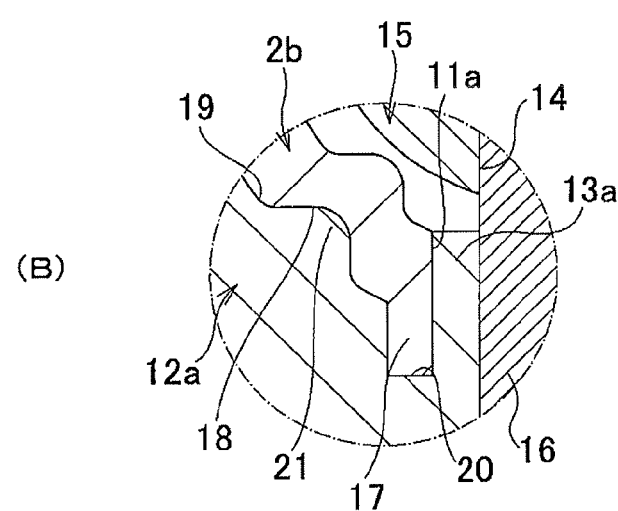
Figure 3C:
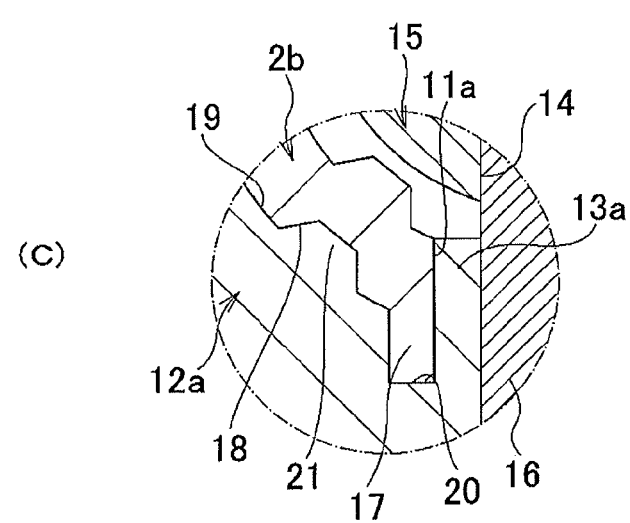

Moreover, concave sections 18 with a bottom are provided at plural locations (four locations in the example in the drawings) in portions on the outside of the protruding wall section 17 on the outer circumferential surface of the steering column 2b, or in other words, in portions that are located on the opposite sides of the protruding wall section 17 from the lock hole 11a. As methods for forming the concave sections 18, there is a method as illustrated in FIG. 3A in which the concave sections 18 are formed at the same time when making the steering column 2b by die cast molding using a light alloy material such as an aluminum alloy, there is a method as illustrated in FIG. 3B in which the concave sections 18 are formed by a drawing press process of the steering column 2b that is a pipe made using a light alloy material such as an aluminum alloy or carbon steel tubing for thin wall machine structure, and there is a method such as illustrated in FIG. 3C in which the concave sections 18 are formed by embossment of a pipe material.

Moreover, the lock unit 12a has a butting surface 19 that comes in contact with the outer circumferential surface of the steering column 2b, and a guide section 13a that is provided on the tip end section of the butting surface 19 (which is a portion that is consistent with the lock hole 11a), and is engaged with the lock hall 11a. There is a concave groove 20 that surrounds the entire circumference of the portion of the butting surface 19 that surrounds the guide section 13a. Moreover, convex sections 21 are provided in portions of the butting surface 19 that are consistent with the concave sections 18 when the lock unit 12a is attached to the steering column 2b. When attaching this kind of lock unit 12a to the steering column 2b, first, the guide section 13a of the lock unit 12a is placed in the portion on the inside of the lock hole 11a, while at the same time, the protruding wall section 17 and the concave groove 20 are engaged, and the concave sections 18 and the convex sections 21 are engaged. In this state, by screwing a bolt, which is inserted through a through hole (not illustrated in the figures) of a clamp jig 22, into a screw hole 23 that is formed in the lock unit 12a and tightening, the lock unit 12a is supported by and fastened to the steering column 2b.

Figure 8:
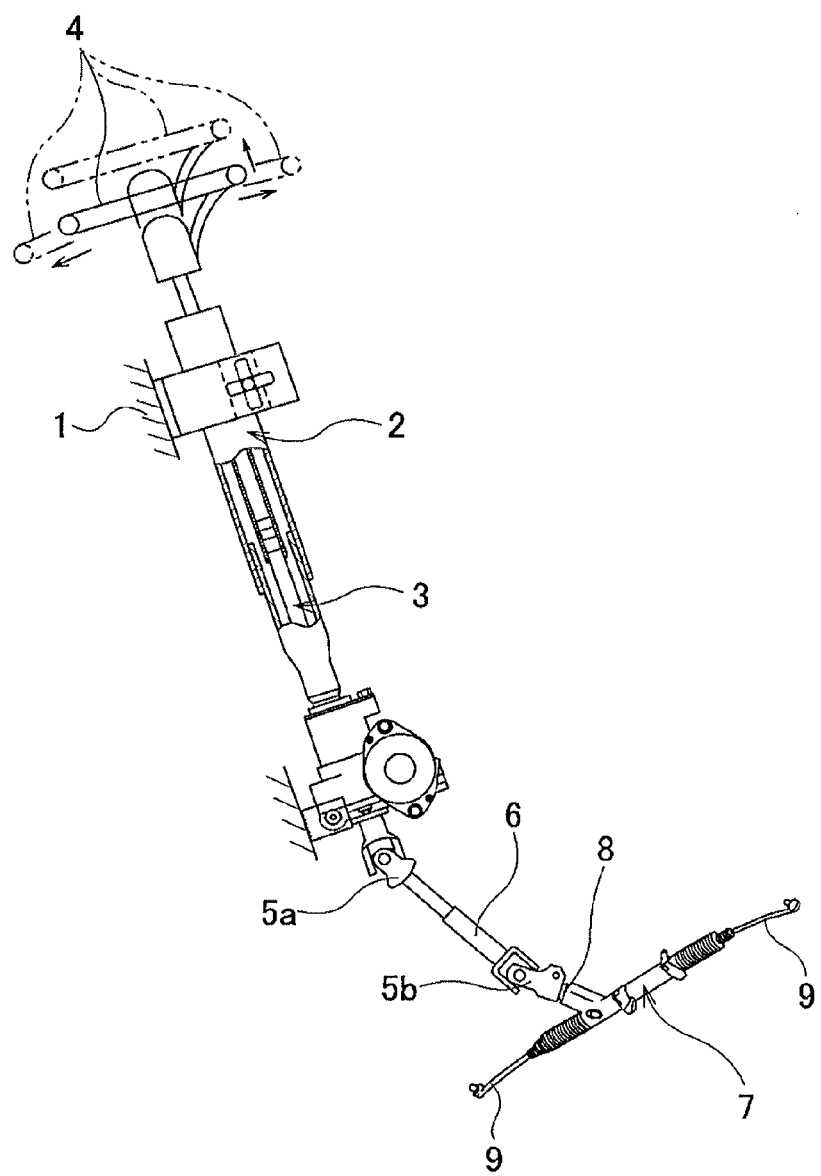
FIG. 8 is a side view of an example of a conventionally known steering apparatus, and illustrates the state in which part is cut away.

In the steering lock apparatus of this example, the occurrence of damage such as cracking of the steering column 2b is effectively prevented even when an attempt is made to rotate the steering wheel 4 (see FIG. 8) by large force when the ignition key is turned OFF. In other words, when there is an attempt to rotate the steering wheel 4 with a large force when the ignition key is turned OFF and the lock pin 16 is engaged with the engaging concave section 14 of the key-lock collar 15, a protruding wall section 17 is provided on the circumferential edge section of the lock hole 11a where the force is applied by way of the guide section 13a. Therefore, the strength and rigidity of the circumferential edge section of the lock hole 11a are increased, and the occurrence of damage such as cracking of the steering column 2 is prevented before the steering shaft 3a is rotated with respect to the key-lock collar 15.

Moreover, in this example, concave sections 18 of the steering column 2b are engaged with convex sections 21 that are provided on the butting surface of the lock unit 12a. Therefore, when there is an attempt to rotate the steering wheel 4 by large force when the ignition key is turned OFF, it is possible to effectively distribute the force that is applied to the steering column 2b from the steering shaft 3a.

Furthermore, in this example, as portions of the steering column 2b that engage with convex sections 21 on the lock unit 12a side, concave sections 18 with a bottom are provided. Therefore, when compared with the structure in which the portions of the steering column that engage with the convex sections of the lock unit side are through holes, it is possible to further improve the strength and rigidity of the steering column 2b.

Second Example of Embodiment

Figure 4:
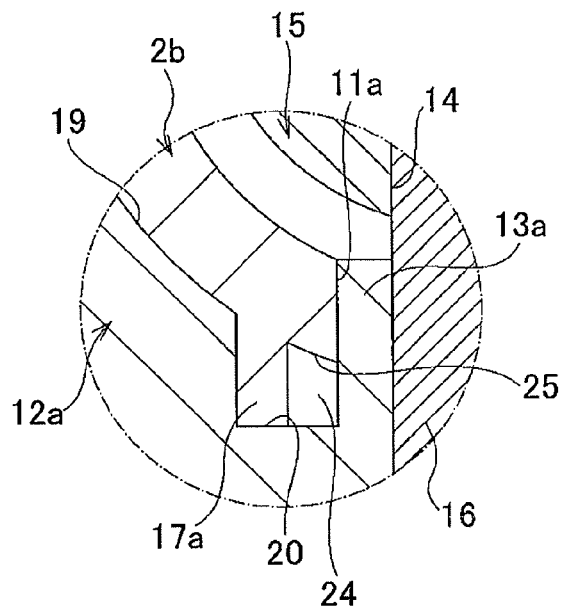
FIG. 4 illustrates a second example of an embodiment of the present invention, and is similar to FIG. 3.

FIG. 4 illustrates a second example of an embodiment of the present invention. In this example, the outer-diameter side half portion of the inside surface of the protruding wall 17a is further separated from the center position of the lock hole 11a than the inner-diameter side half portion thereof, the inner dimension of the outer-diameter side half portion is enlarged and a space 24 is provided between the inside surface of the protruding wall section 17a and the outside surface of the guide section 13a of the lock unit 12a. In other words, by providing the protruding wall section 17a further on the outside than the circumferential edge section of the lock hole 11a, a stepped section 25 is provided between the protruding wall section 17a and the lock hole 11a.

With the structure of this example, when there is an attempt to rotate the steering wheel 4 by large force when the ignition key is turned OFF, there is no force applied from the guide section 13a of the lock unit 12a to the outer-diameter side end section of the protruding wall section 17a, or in the case that force is applied, it is possible to make that force small. In other words, it is possible to eliminate a large force being applied to the edge on the tip end (edge of the outer-diameter side end) of the protruding wall section 17a, which is a point where damage such as cracking easily occurs. Therefore, it is possible to more effectively prevent the occurrence of damage such as cracking of the protruding wall section 17a before the steering shaft 3a is rotated with respect to the key-lock collar 15. In addition, by separating only the outer-diameter side end section of the inside surface of the protruding wall section 17a instead of the entire outer-diameter side half of the inside surface of the protruding wall section 17a from the center position of the lock hole 11a, it is also possible to provide a space between that end section and the outside surface of the guide section 13a of the lock unit 12a. In other words, in this example, a space is formed between the outer-diameter side end section and the outside surface of the guide section 13a of the lock unit 12a by separating that end section from the center position of the lock hole 11a further than the portion on the inside surface of the protruding wall section 17a that is near the inner-diameter side within a range of ⅕ to ½, and preferably ¼ or greater on the outer-diameter side. The structure and functions of the other parts are the same as in the first example of an embodiment.

Third Example of Embodiment

Figure 5:
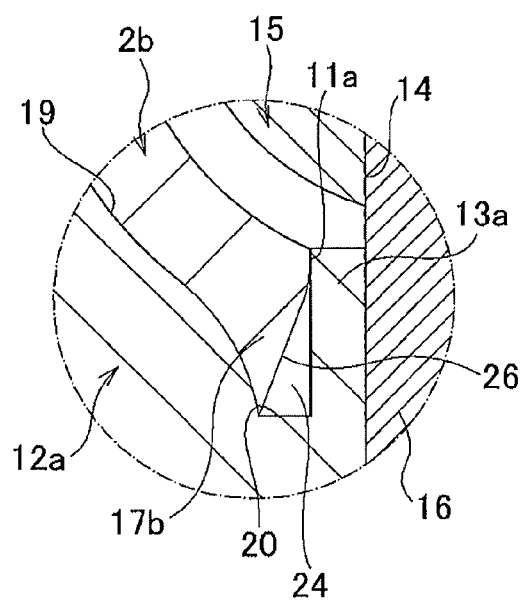
FIG. 5 illustrates a third example of an embodiment of the present invention, and is similar to FIG. 3.

FIG. 5 illustrates a third example of an embodiment of the present invention. In this example, an inclined surface section 26, which is inclined in a direction toward the outside of the protruding wall section 17b going outward in the radial direction, is provided in a large part of the outer-diameter side of the inside surface of the protruding wall section 17b. Moreover, the thickness of the protruding wall section 17b is the thickest at the base end section (inner-diameter side end section), and becomes thinner going toward the tip end section (outer-diameter side end section). This inclined surface section 26 can be provided over the entire inside surface of the protruding wall section 17b, or can be provided only on the outer-diameter side half portion.

With this example, the force that is applied to the inside surface of the protruding wall section 17b can be made smaller going toward the outside in the radial direction. Moreover, by making the thickness of the base end section of the protruding wall section 17b the thickest, and having the thickness become thinner going toward the tip end section, the weight of the steering column 2b is prevented from increasing unnecessarily, while maintaining the strength and rigidity against the force that is applied to the inside surface of the protruding wall section 17b. The structure and functions of the other parts are the same as in the first and second examples of an embodiment.

Fourth Example of Embodiment

Figure 6:
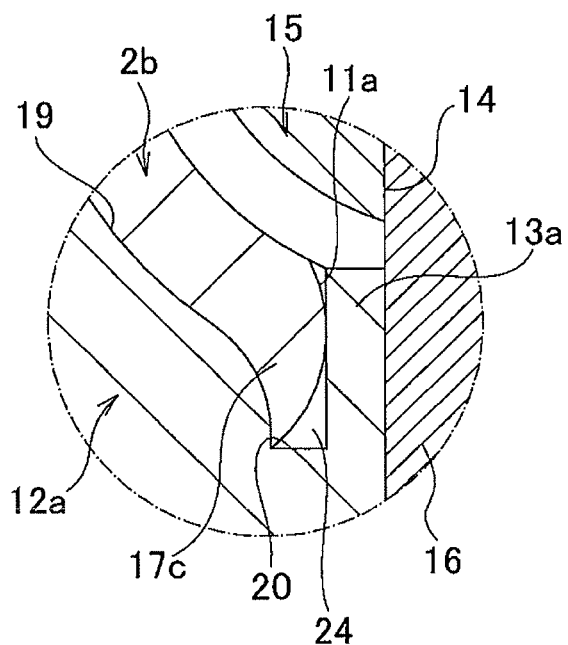
FIG. 6 illustrates a fourth example of an embodiment of the present invention, and is similar to FIG. 3.

FIG. 6 illustrates a fourth example of an embodiment of the present invention. In this example, the inside surface of the protruding wall section 17c is such that the cross-sectional shape is a partial arc shaped concave curved surface that protrudes the most in the middle section in the radial direction. A force that is applied to the inside surface of the protruding wall section 17c is received by the middle section in the radial direction, so it is possible to reduce the force that is applied to the edge on the tip end of the protruding wall section 17c (edge of the end on the outer-diameter side), which is a point where cracking easily occurs. The structure and functions of the other parts are the same as in the first and second example of an embodiment.

Fifth Example of an Embodiment

Figure 7:
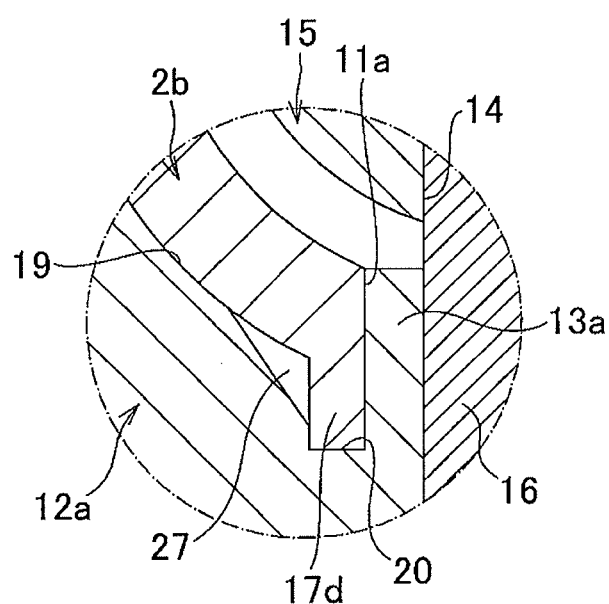
FIG. 7 illustrates a fifth example of an embodiment of the present invention, and is similar to FIG. 3.

FIG. 7 illustrates a fifth example of an embodiment of the present invention. In this example, reinforcing ribs 27 are provided at plural locations on the outside surface of the protruding wall section 17d, which makes it possible to further improve the strength and rigidity of the protruding wall section 17d. The structure and functions of the other parts are the same as in the first example of an embodiment.

EXPLANATION OF REFERENCE NUMBERS

1 Vehicle body
2, 2a, 2b Steering column
3, 3a Steering shaft
4 Steering wheel
5a, 5b Universal joint
6 Intermediate shaft
7 Steering gear unit
8 Input shaft
9 Tie rod
10 Steering lock apparatus
11, 11a Lock hole
12, 12a Lock unit
13, 13a Guide unit
14 Engaging concave section
15 Key-lock collar
16 Lock pin
17, 17a to 17d Protruding wall section
18 Concave section
19 Butting surface
20 Concave groove
21 Convex section
22 Clamp jig
23 Screw hole
24 Space
25 Stepped section
26 Inclined surface section
27 Reinforcing rib

What is claimed is:
1. A steering lock apparatus comprising:
a steering column having a lock hole that is provided in a part of an outer circumferential surface of the steering column so as to pass through the steering column in a radial direction of the steering column, and a protruding wall section that is provided on the outer circumferential surface so as to surround the lock hole;
a key-lock collar that is supported by a portion of a steering shaft, which is supported on an inside of the steering column so as to be able to rotate freely, a phase of the portion in an axial direction of the steering column coinciding with the lock hole, and that has an engaging concave section provided in at least one location on the outer circumferential surface in a circumferential direction of the steering column; and
a lock unit that is supported by and fastened to the steering column and that has: a butting surface that comes in contact with the outer circumferential surface of the steering column a guide section that is formed on a tip end section of the butting surface and is located in an inside portion of the lock hole when the butting surface is in contact with the outer circumferential surface of the steering column a concave groove that is formed in a portion of the butting surface that surrounds the guide section and engages with the protruding wall section; and a locking pin that essentially prevents rotation of the steering shaft when an ignition key is turned OFF by displacing inward in the radial direction of the steering column, causing the tip end section of the locking pin to engage with the engaging concave section, wherein an inside surface of the protruding wall section at least in an outer-diameter side end section is further separated from a center position of the lock hole than the inside surface in a portion near an inner-diameter side of the protruding wall.

2. The steering lock apparatus according to claim 1, wherein an inclined surface section that is inclined in a direction toward an outside of the protruding wall section going outward in a radial direction of the protruding wall section is provided in at least an outer-diameter side half portion of the inside surface of the protruding wall section.

3. A steering lock apparatus comprising:

a steering column having a lock hole that is provided in a part of an outer circumferential surface of the steering column so as to pass through the steering column in a radial direction of the steering column, and a protruding wall section that is provided on the outer circumferential surface so as to surround the lock hole;

a key-lock collar that is supported by a portion of a steering shaft, which is supported on an inside of the steering column so as to be able to rotate freely, a phase of the portion in an axial direction of the steering column coinciding with the lock hole, and that has an engaging concave section provided in at least one location on the outer circumferential surface in a circumferential direction of the steering column; and a lock unit that is supported by and fastened to the steering column and that has: a butting surface that comes in contact with the outer circumferential surface of the steering column; a guide section that is formed on a tip end section of the butting surface and is located in an inside portion of the lock hole when the butting surface is in contact with the outer circumferential surface of the steering column; a concave groove that is formed in a portion of the butting surface that surrounds the guide section and engages with the protruding wall section; and a locking pin that essentially prevents rotation of the steering shaft when an ignition key is turned OFF by displacing inward in the radial direction of the steering column, causing the tip end section of the locking pin to engage with the engaging concave section, wherein an inside surface of the protruding wall section comprises a convex curved surface having a partial arc shape in cross section that protrudes most in a middle section in a radial direction of the protruding wall section.

4. A steering lock apparatus comprising:

a steering column having a lock hole that is provided in a part of an outer circumferential surface of the steering column so as to pass through the steering column in a radial direction of the steering column, and a protruding wall section that is provided on the outer circumferential surface so as to surround the lock hole;

a key-lock collar that is supported by a portion of a steering shaft, which is supported on an inside of the steering column so as to be able to rotate freely, a phase of the portion in an axial direction of the steering column coinciding with the lock hole, and that has an engaging concave section provided in at least one location on the outer circumferential surface in a circumferential direction of the steering column; and a lock unit that is supported by and fastened to the steering column and that has: a butting surface that comes in contact with the outer circumferential surface of the steering column; a guide section that is formed on a tip end section of the butting surface and is located in an inside portion of the lock hole when the butting surface is in contact with the outer circumferential surface of the steering column; a concave groove that is formed in a portion of the butting surface that surrounds the guide section and engages with the protruding wall section; and a locking pin that essentially prevents rotation of the steering shaft when an ignition key is turned OFF by displacing inward in the radial direction of the steering column, causing the tip end section of the locking pin to engage with the engaging concave section, wherein a concave section is formed on an outside of the protruding wall section of the outer circumferential surface of the steering column, a convex section is formed on a part of the butting surface of the lock unit, and the convex section engages with the concave section.

5. The steering lock apparatus according to claim 4, wherein the concave section has a bottom.

* * * * *